(12) United States Patent
Lamkin et al.

(10) Patent No.: US 9,269,205 B1
(45) Date of Patent: Feb. 23, 2016

(54) AIRCRAFT ENVIRONMENTAL IMPACT MEASUREMENT SYSTEM

(71) Applicant: HONEYWELL INTERNATIONAL INC., Morristown, NJ (US)

(72) Inventors: Andrew Fannon Lamkin, Albuquerque, NM (US); Matthew Warpinski, Albuquerque, NM (US); Duke Buster, Albuquerque, NM (US); Joseph J. Nutaro, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/504,092

(22) Filed: Oct. 1, 2014

(51) Int. Cl.
*G07C 5/08* (2006.01)
*G08G 5/00* (2006.01)
*G06Q 30/02* (2012.01)

(52) U.S. Cl.
CPC .......... *G07C 5/0808* (2013.01); *G06Q 30/0201* (2013.01); *G07C 5/0825* (2013.01); *G07C 5/0841* (2013.01); *G08G 5/0052* (2013.01)

(58) Field of Classification Search
USPC .......................................................... 701/14
See application file for complete search history.

(56) References Cited

U.S. PATENT DOCUMENTS

| | | | |
|---|---|---|---|
| 7,415,418 B2 * | 8/2008 | Zimmerman | 705/308 |
| 7,457,758 B2 * | 11/2008 | Zimmerman | 705/1.1 |
| 7,957,981 B2 * | 6/2011 | Zimmerman | 705/1.1 |
| 8,209,101 B2 * | 6/2012 | Breit | 701/80 |
| 8,600,653 B2 | 12/2013 | Elkaim et al. | |
| 8,655,791 B2 * | 2/2014 | Zimmerman | 705/308 |
| 8,812,352 B2 * | 8/2014 | Boss et al. | 705/13 |
| 9,013,331 B2 * | 4/2015 | Wise | 340/961 |
| 2003/0093187 A1 * | 5/2003 | Walker | 701/1 |
| 2005/0216139 A1 * | 9/2005 | Laughlin et al. | 701/3 |
| 2005/0273358 A1 * | 12/2005 | Zimmerman | 705/1 |
| 2009/0204453 A1 * | 8/2009 | Cooper et al. | 705/7 |
| 2010/0070316 A1 * | 3/2010 | Lieberman et al. | 705/7 |
| 2011/0022404 A1 | 1/2011 | Peterson | |

(Continued)

FOREIGN PATENT DOCUMENTS

| | | |
|---|---|---|
| EP | 2287822 A2 | 2/2011 |
| EP | 2660563 A1 | 11/2013 |

(Continued)

OTHER PUBLICATIONS

Jardine, C.N.; Calculating the Carbon Dioxide Emissions of Flights; Environmental Change Institute; Feb. 2009.

(Continued)

*Primary Examiner* — Thomas Tarcza
*Assistant Examiner* — Alex C Dunn
(74) *Attorney, Agent, or Firm* — Ingrassia Fisher & Lorenz, P.C.

(57) ABSTRACT

An environmental impact measurement system for an aircraft includes a one-way data interface and a processing system. The one-way data interface is adapted to continuously receive and transmit aircraft data and flight plan data. The processing system is in operable communication with the one-way data interface to receive the aircraft data and the flight plan data transmitted therefrom. The processing system is configured, upon receipt of the aircraft data and the flight plan data, to generate at least data representative of real-time environmental impact of the aircraft, and recommendations for improving the real-time environmental impact of the aircraft.

27 Claims, 6 Drawing Sheets

(56) References Cited

U.S. PATENT DOCUMENTS

| | | |
|---|---|---|
| 2011/0099022 A1 | 4/2011 | Stochniol |
| 2011/0208621 A1* | 8/2011 | Feierstein et al. ............... 705/30 |
| 2012/0078450 A1 | 3/2012 | Marche et al. |
| 2012/0323499 A1 | 12/2012 | Yelin et al. |
| 2013/0085638 A1* | 4/2013 | Weinmann et al. ............. 701/36 |
| 2013/0131888 A1* | 5/2013 | Nutaro et al. .................... 701/1 |
| 2013/0218446 A1 | 8/2013 | Bradley et al. |
| 2013/0289804 A1* | 10/2013 | Covington et al. ............. 701/14 |
| 2014/0138478 A1* | 5/2014 | Cox et al. ........................ 244/50 |
| 2014/0257598 A1 | 9/2014 | Bailey et al. |
| 2014/0339372 A1* | 11/2014 | Dekel et al. ................... 244/7 R |

FOREIGN PATENT DOCUMENTS

| | | |
|---|---|---|
| JP | 2003034300 A | 2/2003 |
| JP | 2007314180 A | 6/2007 |

OTHER PUBLICATIONS

Extended EP search report for Application No. 15187451.8-1958 dated Nov. 24, 2015.

* cited by examiner

AIRCRAFT ENVIRONMENTAL IMPACT MEASUREMENT SYSTEM

TECHNICAL FIELD

The present invention generally relates to aircraft emissions, and more particularly relates to systems and methods for measuring the environmental impact of an aircraft.

BACKGROUND

Regardless of one's viewpoint, the issue of climate change is, and will likely remain, a primary concern to many legislative bodies and regulatory agencies worldwide. Indeed, various carbon emission restrictions have been, are being, or will be, enacted around the globe (e.g., cap-and-trade). As a result, tools for assessing and managing the carbon footprint of, for example, aircraft is a rapidly emerging need.

In particular, airlines and air crews need a way to measure carbon emissions and environmental impact of their aircraft in different airspaces. Airlines and air crews also need a way to receive feedback regarding their real-time carbon footprint so that this data may be used to plan and optimize their operations, while at the same time balancing cost and flight schedule. Moreover, the monetary value of so-called "carbon credits" and carbon footprint is high. Therefore, reliable evidence of fuel burn and generated carbon will need to be available to regulators to confirm claimed savings. Presently, however, there is no common system or method for implementing these functions. Thus, it may be difficult for the airline industry to participate in any proposed international cap and trade programs.

Hence, there is a need for a system and method for measuring carbon emissions and environmental impact of aircraft in different airspaces and/or for providing feedback, and/or for gathering evidence of fuel burn and generated carbon for use by regulators. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an environmental impact measurement system for an aircraft includes a one-way data interface and a processing system. The one-way data interface is adapted to continuously receive and transmit aircraft data and flight plan data. The processing system is in operable communication with the one-way data interface to receive the aircraft data and the flight plan data transmitted therefrom. The processing system is configured, upon receipt of the aircraft data and the flight plan data, to generate at least data representative of real-time environmental impact of the aircraft, and recommendations for improving the real-time environmental impact of the aircraft.

In another embodiment, an environmental impact measurement system for an aircraft includes a one-way data interface and a data collection system. The one-way data interface is adapted to continuously receive and transmit aircraft data and flight plan data. The data collection system is in operable communication with the one-way data interface and is configured to receive at least a portion of the aircraft data, determine, based at least in part on the aircraft data, carbon emission rate data, and store the aircraft data and carbon emission rate data.

In yet another embodiment, an environmental impact measurement system for an aircraft includes a one-way data interface, a display device, and a processing system. The one-way data interface is adapted to continuously receive and transmit aircraft data and flight plan data. The display device is coupled to receive display commands and is configured, in response to the received commands, to render one or more images. The processing system is in operable communication with the display device and the one-way data interface. The processing system is coupled to receive the aircraft data and the flight management data transmitted from the one-way data interface and is configured, upon receipt of the aircraft data and the flight plan data, to generate at least data representative of real-time environmental impact of the aircraft, and recommendations for improving the real-time environmental impact of the aircraft. The processor is further is configured, upon receipt of the aircraft data and the flight plan data, to generate commands that cause the display device to render one or more images representative of the real-time environmental impact of the aircraft, and the recommendations for improving the real-time environmental impact of the aircraft.

Furthermore, other desirable features and characteristics of the environmental impact measurement system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
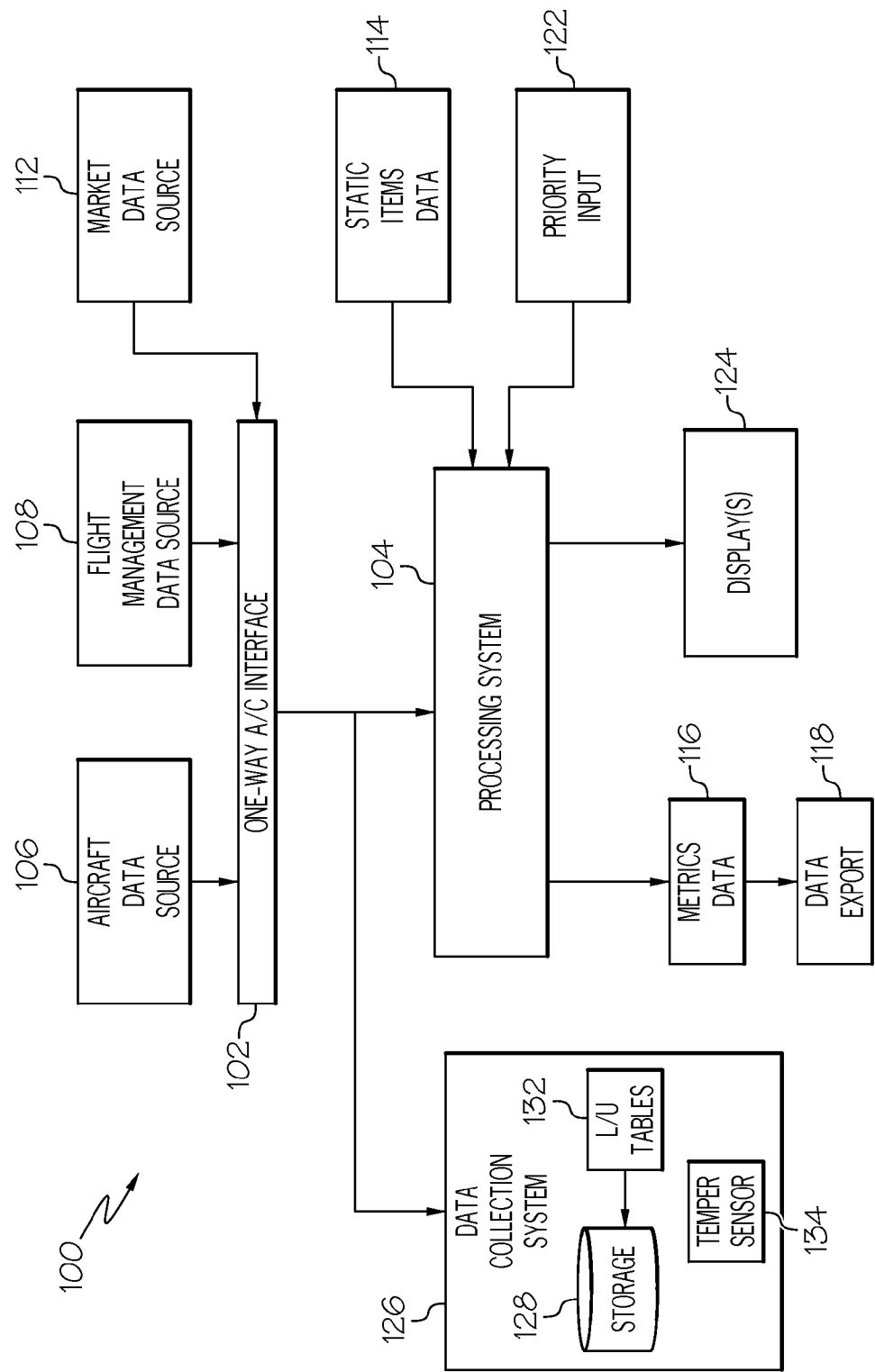
FIG. 1 depicts a functional block diagram of an embodiment of an aircraft environmental impact assessment system.

Referring first to FIG. 1, a functional block diagram of an aircraft environmental impact assessment system 100 is depicted and includes a one-way data interface 102 and a processing system 104. The one-way data interface 102 is adapted to continuously receive aircraft data from an aircraft data source 106 (described below), and flight management data from a flight management data source 108 (also described below). The one-way data interface 102 is configured to transmit the received aircraft data and the received flight plan data to the processing system 104. The one-way data interface 102 may be variously implemented but, as its name implies, it is configured to allow only one-way transmission of data. Thus, the one-way data interface 102 is configured to transmit the received aircraft data and flight plan data to the processing system 104, but does not allow data from the processing system 104 (or other systems) to be transmitted back to the aircraft data source 106 or the flight plan data source 108.

The processing system 104 is in operable communication with the one-way data interface 102. The processing system 104 receives the aircraft data and the flight management data transmitted from the one-way data interface 102 and is configured, upon receipt of these data, to generate various environmental impact related data. In particular, the processing system 104 generates at least data representative of the real-time environmental impact of the aircraft, and data representative of recommendations for improving the real-time environmental impact of the aircraft.

More specifically, and as FIG. 1 also depicts, the processing system 104 is also in operable communication with (or includes) a market data source 112, a static items data source 114, a metrics data storage device 116, a data export interface 118, a priority input user interface 122, and one or more display devices 124. The processing system 104, in response to the aircraft data, the flight management data, and inputs from at least the market data source 112, the static items data source 114, and the priority input user interface 122, evaluates the impact of the current aircraft flight profile, considering the aircraft type, the planned flight path, the weather conditions, and various market factors such as fuel price, and generates various metrics and performance data for flight crews and airlines. The processing system 104 is additionally configured to combine data representative of items such as fuel burn, weight, procedural factors, wait time, and flight time, with various types of stored data, such as aircraft type information, and with pilot priorities to generate intuitive metrics, logging, and feedback for airlines and flight crews.

The processing system 104 may also command the one or more display devices 124 to render one or more images representative of the real-time environmental impact of the aircraft, to thereby provide real-time feedback of the aircraft's environmental impact to the flight crew. The processing system 104 may also command the one or more display devices 124 to render one or more images representative of the recommendations for improving the real-time environmental impact of the aircraft. The recommendations may vary in type and number, and may include, for example, recommended flight routes for minimized environmental impact, recommended altitudes for minimized environmental impact, recommended cruise numbers for minimized environmental impact, and pilot advisories based on ranked priorities, just to name a few.

Figure 2:
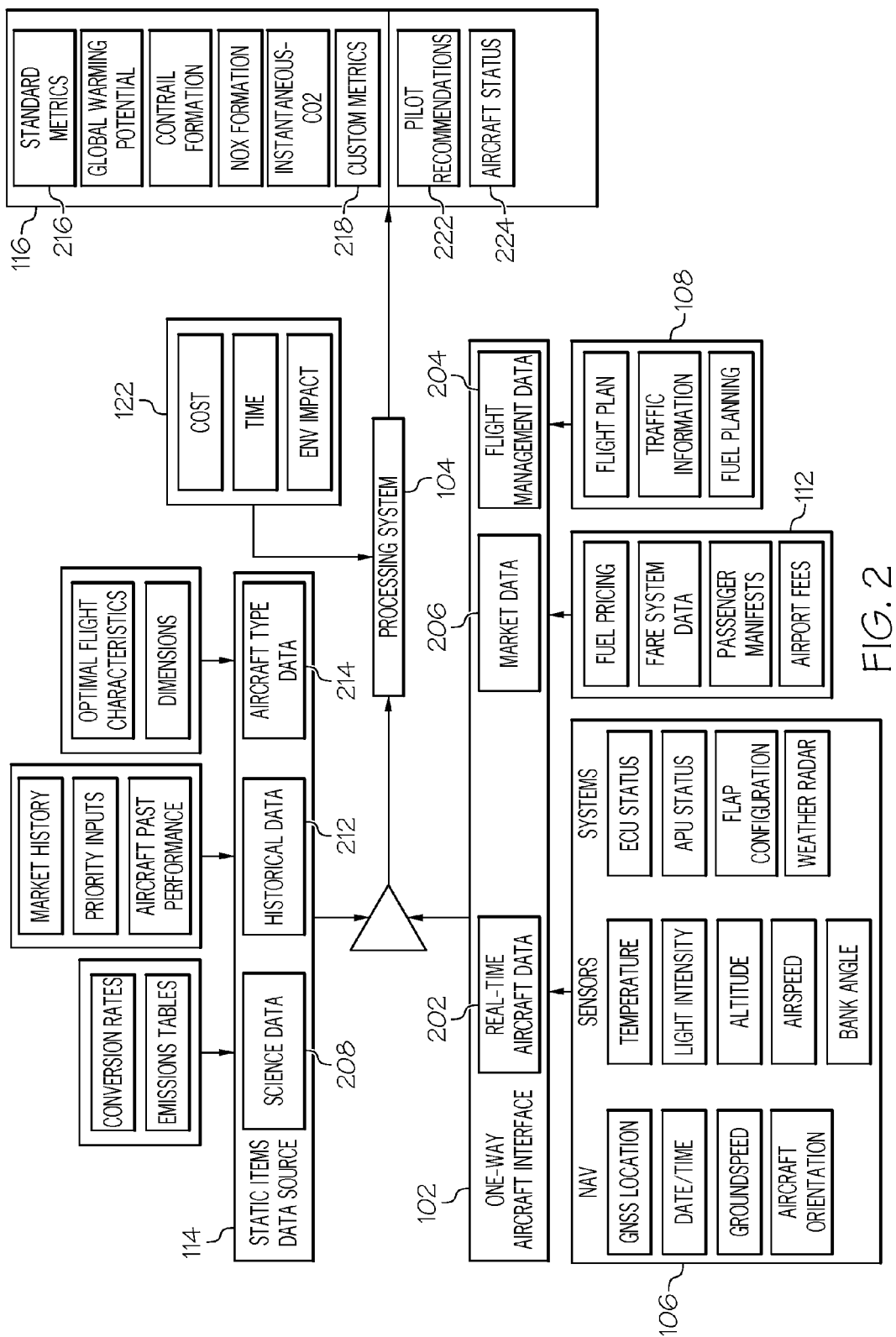
FIG. 2 depicts a more detailed functional block diagram of the aircraft environmental impact assessment system of FIG. 1.

Turning to FIG. 2, the inputs supplied by the data supplied by the aircraft data source 106, the flight management data source 108, the market data source 112, the static items data source 114, and the priority input user interface 122, as well as the outputs supplied to the metrics data storage device 116 and to the one or more display devices 124, are depicted and will now be described in more detail, beginning with the aircraft data source 106.

The aircraft data source 106 may be variously configured and implemented. In the depicted embodiment, the aircraft data source 106 is implemented using a plurality of aircraft navigational devices, sensors, and systems. Although these navigational devices, sensors, and systems may vary, in the depicted embodiment these include devices, sensors, and systems that provide various types of real-time aircraft data 202. Although the number and types of aircraft data may vary, in the depicted embodiment these include data representative of global navigation satellite system (GNSS) location, date and time, groundspeed, aircraft orientation, temperature, light intensity, altitude, airspeed, bank angle, engine status (e.g., fuel flow, engine temperatures), auxiliary power unit (APU) status, flap configuration, and weather, just to name a few.

The flight management data source 108 may also be variously configured and implemented. In the depicted embodiment, the flight management data source 108 is implemented using devices, sensors, and systems that provide various types of real-time flight management data 204. Such systems may include, for example, the aircraft flight management system (FMS) and the aircraft traffic collision avoidance system (TCAS). Regardless of how the flight management data source 108 is specifically implemented, it will be appreciated that the number and types of flight management data it provides may vary. In the depicted embodiment, the flight management data includes data representative of the current flight plan, traffic information, and fuel planning, just to name a few.

The market data source 112 may also be variously configured and implemented. In the depicted embodiment, the market data source 112 is implemented using a system that provides access to various types of real-time market-related data 206. Such systems may include, for example, a web-connection that allows access to real-time market data (e.g., the internet), or a storage device on which the most up-to-date market data 206 and/or future predictions of the market has been stored. Regardless of how the market data source 112 is specifically implemented, it will be appreciated that the number and types of market data 206 it provides may vary. In the depicted embodiment, the market data includes data representative of the current fuel price, various fare system data (e.g., how many passengers are waiting at the destination), passenger manifests, and airport fees, just to name a few.

Though not depicted in FIG. 2, the aircraft data source 106, flight management data source 108, and the market data source 112 may supply the aircraft data, flight management data, and market data, respectively, to an aircraft data bus. The aircraft data bus 202, which may be implemented using, for example, an ARINC bus, may be in operable communication with, and supply these data to, the one-way data interface 102 for transmission to the processing system 104.

The static items data source 114 has relatively non-dynamic data stored therein. As used herein, relatively non-dynamic data are data that do not change frequently. For example, data that does not change hour-to-hour, flight-to-flight, day-to-day, or even week-to-week, but instead may change from year-to-year or decade-to-decade if, for example, new research necessitates such changes/updates. In the depicted embodiment, this non-dynamic data include science data 208, historical data 212, and aircraft type data 214. The science data 208, as used herein, includes various conversion rates and emission tables. The conversion rates may include, for example, data that may be used to convert various units of fuel and/or oil usage into various units of greenhouse gas (e.g., $CO_2$ and/or NOx) generation. The emission tables may include, for example, look-up tables that list expected emissions levels for a given aircraft type and engine configuration, normalized impacts for various combustion products at altitude such as particulate matter (soot), water vapor, CO2, NOx, HC, Sox.

The historical data 212, as used herein, includes market history data, priority inputs data, and past aircraft performance data. The market history data includes, for example, data representative of the historical price of fuel, historical aircraft entry fees at various airports, the dollar impact of delays, the dollar impact of flight early arrivals, flight fill rates in terms of time and calendar date, and route timing information by time and calendar date, just to name a few. The priority inputs data includes data representative of the past priorities (described further below) selected by the flight crew using the priority input user interface 112. This records the choices made by the crew or airline in the past on the aircraft and helps give a date/time/location for each time a priority choice was made. The past aircraft performance data includes data representative of the aircraft's historical environmental impact, the aircraft's historical total fuel burn and fuel burn rates, rates of speed, climb performance, maneuvering performance all logged to compare against current performance and generated impacts. The historical data 212 may be sourced by various air carriers or provided by a third-party service provider.

The aircraft type data 214, as used herein, includes optimal aircraft data and aircraft dimension data. The optimal aircraft data includes data representative of predefined optimal operating characteristics of the aircraft, such as the optimal cruise speed of the aircraft, the optimal altitude of the aircraft, etc. The aircraft dimension data includes data representative of various dimensions of the aircraft, such as size, weight, etc. Such data are commonly available from aircraft manuals.

All of the above-described data, which are supplied from the aircraft data source 106, the flight management data source 108, the market data source 112, and the static items data source 114 are used by the processing system 104 to, as noted above, generate data representative of the real-time environmental impact of the aircraft, and data representative of recommendations for improving the real-time environmental impact of the aircraft. The processing system 104 is additionally configured to generate the data representative of the recommendations based on priority input data supplied from the priority input user interface 122.

More specifically, and as FIG. 2 further depicts, the priority input user interface 122 allows the flight crew to establish priorities for the recommendations that are generated, based on cost, time (i.e., time to destination (TTD)), and environmental impact. The priority input user interface 122 may be configured to allow selection of only one of these factors (time, cost, environmental impact), or to allow the flight crew to assign a weighted value to each of these factors, to thereby establish the optimization variables based on the daily (or hourly, or location-based) priorities of the airlines. For example, during normal operations an airline may consider cost and environmental impact as equally important, so the flight crew may assign 50% to these two factors. If, however, flights are running behind and the airline is trying to catch up, it may consider time to be of utmost importance, and have its flight crews assign 80% to time and 20% to cost. Although the priority inputs user interface 122 is depicted in FIGS. 1 and 2 as being implemented separate from other components and functions within the system 100, this is done merely for clarity. Indeed, as will be described further below, in some embodiments the priority inputs user interface 122 may be implemented as part of one or more of the displays 124.

As repeatedly noted above, the processing system 104 is configured to generate various types of targeted outputs. These targeted outputs include various performance metrics for airlines, and various types of feedback for display to airline flight crews. The performance metrics may vary, and may include both standard performance metrics 216 and custom performance metrics 218. As FIG. 2 also depicts, the performance metrics 216, 218 are preferably stored in the metrics data storage device 118, and may be retrieved therefrom via the data export interface 122.

The standard performance metrics 216 include metrics that are likely considered significant to most (if not all) operating platforms. Such metrics include, for example, data representative of global warming potential (GWP), contrail formation, NOx formation, and instantaneous CO2 emissions, just to name a few. The custom performance metrics 218 may vary from platform to platform, based on the importance of various performance metrics to different platforms. For example, a logistics platform may not consider certain performance metrics to be as important as a commercial passenger platform, and vice-versa. The custom performance metrics 218 may vary, and may include, for example, data representative of aircraft performance over time (looking at logged climb performance versus engine settings may indicate engine performance degradation for example), airline specific metrics such as late arrivals versus missed connections, and route timing.

The data used to provide feedback for display include the previously mentioned recommendations 222, as well as various feedback regarding aircraft status 224—including both specific aircraft system status and overall environmental impact status. The manner in which the recommendations 222 and status 224 feedback may be rendered on the display device(s) 124 may vary. One specific implementation is depicted in FIG. 6, and will be described momentarily. Before doing so, however, reference should first be made to FIGS. 3-5, which depict block diagram representations of exemplary data flow and calculations in the aircraft environmental impact assessment system 100 when the flight crew establishes a priority of cost (FIG. 3), time (FIG. 4), and environmental impact (FIG. 5), respectively. It should be noted that FIGS. 3 and 5 each include sets of dashed lines. These dashed lines represent second data flow paths for the particular example calculations that are depicted.

Figure 3:
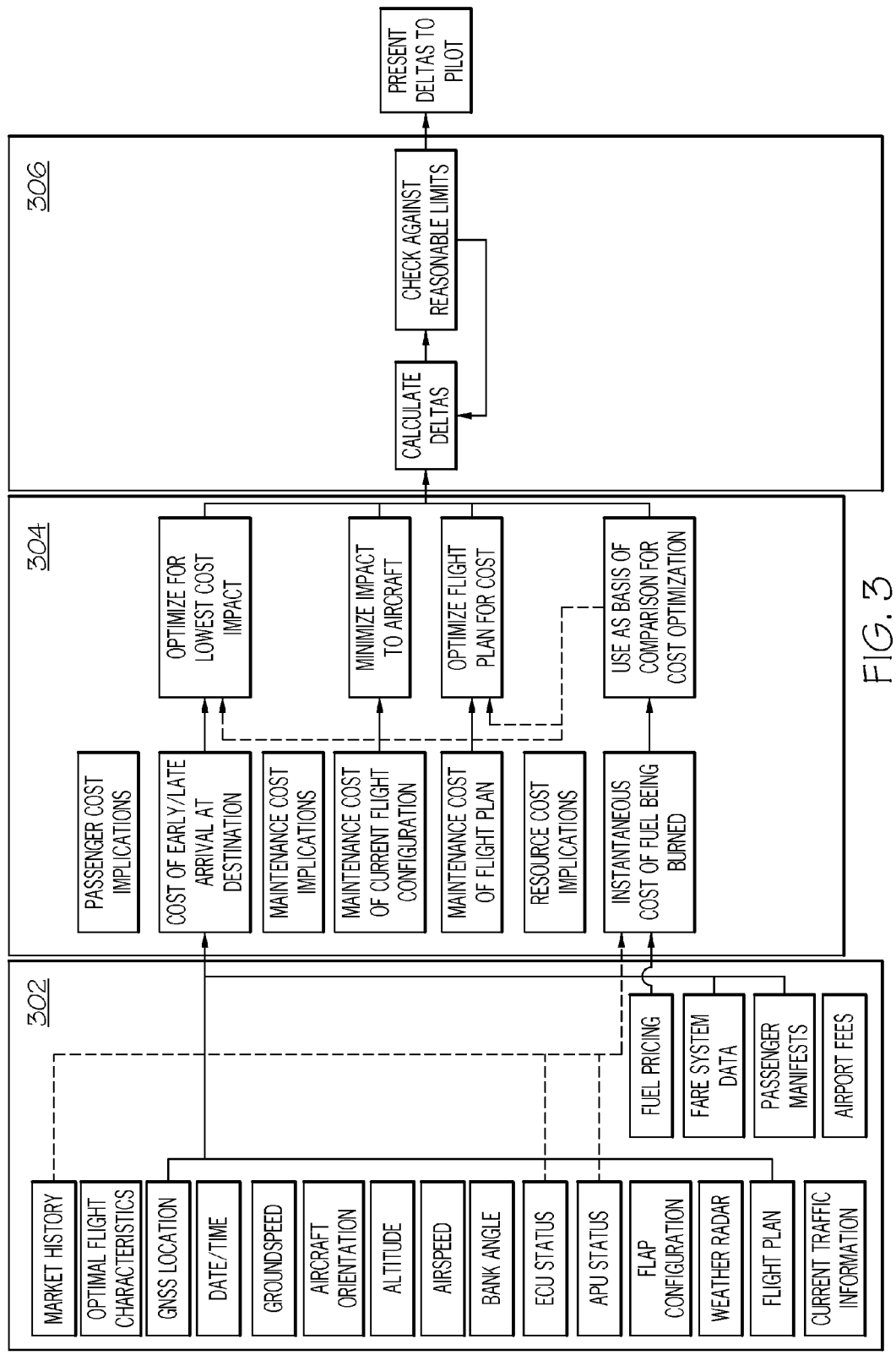
FIGS. 3-5 depict block diagram representations of exemplary data flow and calculations in the aircraft environmental impact assessment system of FIG. 1 with priorities of cost, time, and environmental impact, respectively.
Figure 4:
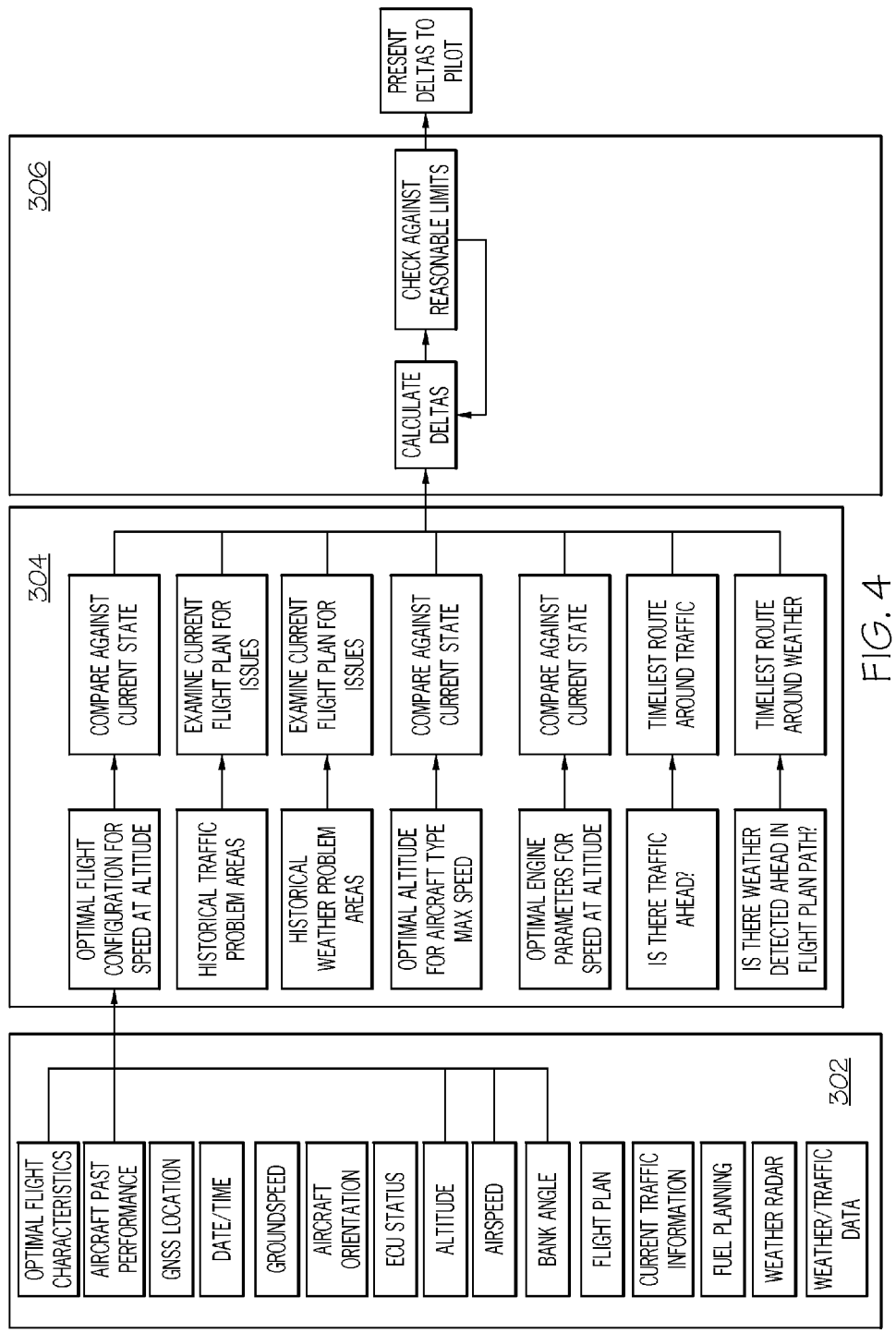
Figure 5:
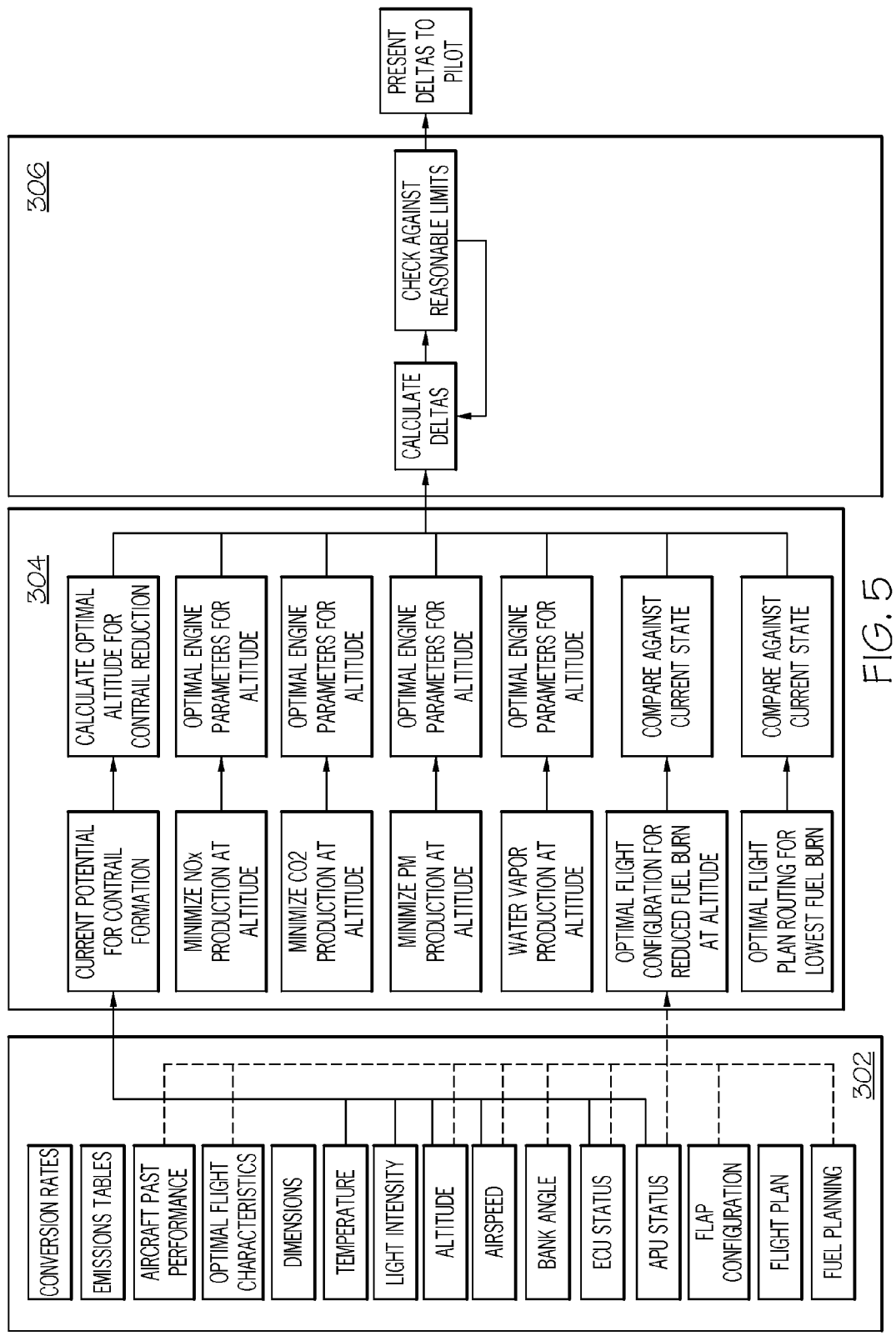
Figure 6:
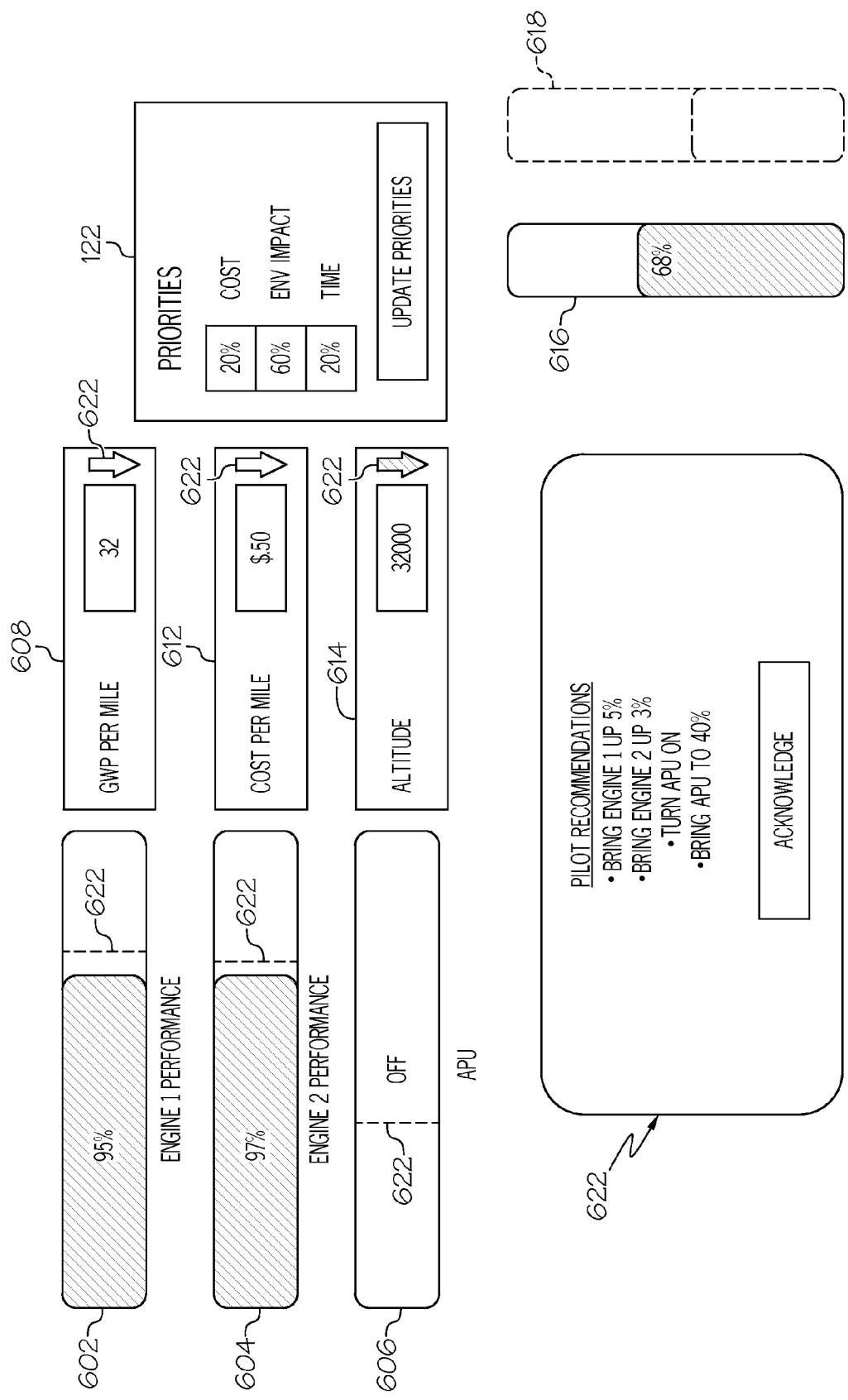
FIG. 6 depicts an exemplary embodiment of a display device that may be implemented in the system of FIG. 1, including various images that may be rendered on the display device.

It is additionally noted that in each of FIGS. 3-5, block 302 represents all of the data sources, and blocks 304 and 306 represent the calculations being implemented in the processor 104. More specifically, block 304 in FIGS. 3-5 represents calculations that are implemented to compare the current state to the optimized state for the associated priority. For example, block 304 in FIG. 3 represents the calculations that are implemented to compare the current state to the cost optimized state, in FIG. 4 it represents the calculations that are implemented to compare the current state to the time optimized state, and in FIG. 5 it represents the calculations that are implemented to compare the current state to the environmental impact optimized state. In each of FIGS. 3-5, block 306 represents the calculations that are implemented to calculate the error of the current state to the optimized (e.g., cost, time, environmental impact) state.

Turning now to FIG. 6, it is noted that the depicted display device 124 may be implemented using any one of the numerous cockpit displays presently installed in aircraft cockpits, or using an electronic flight bag (EFB), or using a portable tablet device. Regardless of its specific implementation, the display device 124, in response to commands supplied by the processing system 104, renders various fields representative of aircraft status. These fields may vary, but in the depicted embodiment include an Engine #1 Performance field 602, an Engine #2 Performance field 604, an APU (auxiliary power unit) field 606, a global warming potential (GWP) Per Mile field 608, a Cost Per Mile field 612, and an Altitude field 614.

The Engine #1 Performance field 602, Engine #2 Performance field 604, and APU field 606 display the current status of engine #1, engine #2, and the APU, respectively. In the depicted example, engine #1 is operating at 97%, engine #2 is operating at 95%, and the APU is off. The GWP Per Mile field 608 displays the instantaneous GWP per mile for the aircraft, the Cost Per Mile field displays the instantaneous cost per mile for the aircraft, and the Altitude field 614 displays the current aircraft altitude. In the depicted example, the instantaneous GWP is 32, the instantaneous cost per mile is $0.50, and the aircraft altitude is 32,000 feet.

The depicted display device 124 also renders an environmental impact field 616. The environmental impact field 616 displays the instantaneous measure of overall system performance from an environmental impact standpoint relative to the best performance the aircraft could attain. This measure may, in some embodiments, be based on the input from the priority input user interface 122, but is preferably not based on this input. A second indicator field 618 (depicted in phantom in FIG. 6) may be used to provide a measure of overall performance based on the input from the priority input user interface 122. It will be appreciated that the environmental impact field 616 (and/or the second indicator field 618) may additionally use color (e.g., green, yellow, orange, red) as an indicator of this performance measure. In the depicted example, the aircraft is operating at 68% of its optimal environmental impact performance capabilities. In those embodiments in which color is additionally used, this value (e.g., 68%) may also result, for example, in at least a portion of the environmental impact field 616 being rendered in an orange or yellow color.

The display device 124 additionally renders recommendations 622 for improving the real-time environmental impact of the aircraft. These recommendations 622, at least in the depicted embodiment, include both textual and graphical recommendations. For example, the display device 124 renders textual recommendations that the flight crew should increase the power output of both engines, and should turn on the APU and increase its power to 40%. The graphical recommendations may mirror some or all of the textual recommendations 622. For example, the Engine #1 Performance field 602, Engine #2 Performance field 604, and APU field 606 are each rendered with dotted lines indicating how much the power output should be raised to meet the textual recommendations. In addition, the Altitude field 614 has a down arrow rendered next to the current altitude, indicating that lowering the current altitude below 32,000 feet could improve overall environmental performance.

As may be appreciated, all of the recommendations, both textual and graphical, are preferably based on the input from the priority input user interface 124. In the depicted example, the flight crew has assigned the greatest weight (60%) to environmental impact, and lower, yet equal weights (20%) to cost and time. If cost and or time were assigned the greatest weight, then the recommendations would change accordingly. It should additionally be appreciated that the recommendations that are generated are preferably provided as suggestions for the flight crew to implement, and are not implemented automatically.

Returning once again to FIG. 1, it is seen that the system 100 additionally includes a data collection system 126. The data collection system 126 is in operable communication with the one-way data interface 102 and may be thought of as a "carbon odometer" of an aircraft's environmental impact. The data collected and stored in the data collection system 126 may be used as evidence by regulators to calculate carbon credits. To do so, the data collection system 126 is configured to receive and store, in a read-only storage medium 128, at least a portion of the aircraft data supplied to the one-way data interface 102. The data collection system 126 is additionally configured to generate, based at least in part on the received aircraft data, carbon emission rate data, and to store the generated carbon emission rate data in the storage medium 128. The aircraft data that are retrieved and stored may vary, but includes time tags, remaining fuel, fuel burn rate, engine temperatures, aircraft position, and aircraft altitude, just to name a few. The data collection system 126 may generate the carbon emission rate data using, for example, well-known look-up tables 132 that correlate fuel burn rate, altitude, and position to carbon emission rate.

As noted above, the data stored in the storage medium 128 is for use as evidence by regulators. Thus, the storage medium 128 is preferably configured such that no data may be added to or overwritten other than recording data from the one-way data interface 102. The data collection system also preferably includes a tamper sensor 134 that is configured to sense unauthorized access to the data collection system 126. In addition, the data collection system 126 preferably includes a relatively simple digital interface to allow users (e.g., regulators) to selectively retrieve the stored data. It will be appreciated that the digital interface 134 may be implemented either wired (e.g., I2C, USB, Ethernet) or wirelessly.

The system 100 described herein measures the carbon emissions and environmental impact of an aircraft in different airspaces, provides feedback to improve environmental impact, and gathers and stores evidence of fuel burn and generated carbon for use by regulators.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An environmental impact measurement system for an aircraft, comprising:
   a one-way data interface adapted to continuously receive and transmit aircraft data and flight plan data;
   a static items data source having stored therein relatively non-dynamic science data, aircraft data, and historic data; and
   a processing system in operable communication with the one-way data interface to receive the aircraft data and the flight management data transmitted therefrom, the processing system configured, upon receipt of the aircraft data and the flight plan data, to generate at least data representative of:
      (i) real-time environmental impact of the aircraft, and
      (ii) recommendations for improving the real-time environmental impact of the aircraft,
   wherein the processing system is in operable communication with the static items data source and is further configured to selectively retrieve at least portions of the science data, the aircraft data, and the historic data from the static items data source and, upon retrieval thereof, to at least generate the data representative of the real-time environmental impact and the recommendations.

2. The system of claim 1, further comprising:
   an aircraft data source in operable communication with the one-way data interface and configured to supply the aircraft data thereto; and
   a flight management data source in operable communication with the one-way data interface and configured to supply the flight management data thereto.

3. The system of claim 2, wherein the aircraft data includes at least data representative of global navigation satellite system (GNSS) location, date and time, groundspeed, aircraft orientation, temperature, light intensity, altitude, airspeed, bank angle, engine status, auxiliary power unit (APU) status, flap configuration, and weather.

4. The system of claim 2, wherein the flight management data includes at least data representative of current flight plan, traffic information, and fuel planning.

5. The system of claim 1, further comprising:
   a market data source in operable communication with the processing system, the market data source configured to supply real-time market data,
   wherein the processing system is further configured to selectively retrieve real-time market data from the market data source and, upon retrieval thereof, to at least generate the data representative of the recommendations.

6. The system of claim 5, wherein the real-time market data includes data representative of the current fuel price, fare system data, passenger manifests, and airport fees.

7. The system of claim 1, wherein:
   the science data includes (i) conversion rates for converting various units of fuel and/or oil usage into units of greenhouse gas generation, and (ii) emission tables that include look-up tables that list expected emissions levels for a given aircraft type and engine configuration, and normalized impacts for various combustion products at altitude;
   the historical data includes market history data, priority inputs data, and past aircraft performance data; and
   the aircraft data includes optimal aircraft data and aircraft dimension data.

8. The system of claim 1, wherein:
the processor is further configured, upon receipt of the aircraft data and the flight plan data, to generate standard performance metrics and custom performance metrics;
the standard performance metrics include data representative of global warming potential (GWP), contrail formation, NOx formation, and instantaneous CO2 emissions; and
the custom performance metrics include data representative of aircraft performance over time, late arrivals versus missed connections, and route timing.

9. The system of claim 8, further comprising:
a non-transitory metrics storage device in operable communication with the processing system, the metrics storage device configured to receive and store the standard performance metrics and the custom performance metrics.

10. The system of claim 9, further comprising:
a data export interface in operable communication with the non-transitory metrics storage device and configured to allow selective retrieval of the standard performance metrics and the custom performance metrics.

11. The system of claim 1, wherein the processing system is further configured:
to receive priority data representative of ranked priorities, the ranked priorities including cost, time, and environmental impact; and
in response to the priority data, to generate one or more advisories based on the ranked priorities.

12. The system of claim 1, further comprising:
a display device in operable communication with the processing system, the display device configured, in response to commands received from the processing system, to display one or more images representative of:
the real-time environmental impact of the aircraft, and
the recommendations for improving the real-time environmental impact of the aircraft.

13. The system of claim 12, wherein the display device is further configured, in response to commands received from the processing system, to render a plurality of fields representative of aircraft status.

14. The system of claim 12, wherein the display device is further configured, in response to commands received from the processing system, to render an environmental impact field that displays an instantaneous measure of overall system performance from an environmental impact standpoint relative to best performance the aircraft could attain.

15. The system of claim 12, wherein the display device is further configured, in response to commands received from the processing system, to render a priority input user interface, the priority input user interface configured to allow a user to establish priorities for the recommendations and supply priority data representative thereof, the priority data representative of ranked priorities that include cost, time, and environmental impact.

16. The system of claim 1, wherein the data representative of recommendations for improving the real-time environmental impact of the aircraft comprise one or more of:
flight route recommendations;
aircraft altitude recommendations; and
cruise number recommendations.

17. The system of claim 1, further comprising:
a data collection system in operable communication with the one-way data interface, the data collection system configured to:
receive at least a portion of the aircraft data,
determine, based at least in part on the aircraft data, carbon emission rate data, and
store the aircraft data and carbon emission rate data.

18. The system of claim 17, wherein the data collection system comprises:
a digital interface configured to allow selective retrieval of the stored aircraft data and carbon emission rate data.

19. The system of claim 17, wherein the data collection system comprises:
a tamper sensor configured to sense unauthorized access to the data collection system.

20. An environmental impact measurement system for an aircraft, comprising:
a one-way data interface adapted to continuously receive and transmit aircraft data and flight plan data; and
a data collection system in operable communication with the one-way data interface, the data collection system configured to:
receive at least a portion of the aircraft data,
determine, based at least in part on the aircraft data, carbon emission rate data, and
store the aircraft data and carbon emission rate data,
wherein the data collection system comprises a digital interface configured to allow selective retrieval of the stored aircraft data and carbon emission rate data.

21. The system of claim 20, wherein the data collection system comprises:
a tamper sensor configured to sense unauthorized access to the data collection system.

22. An environmental impact measurement system for an aircraft, comprising:
a one-way data interface adapted to continuously receive and transmit aircraft data and flight plan data; and
a processing system in operable communication with the one-way data interface to receive the aircraft data and the flight management data transmitted therefrom, the processing system configured, upon receipt of the aircraft data and the flight plan data, to generate at least data representative of:
(i) real-time environmental impact of the aircraft, and
(ii) recommendations for improving the real-time environmental impact of the aircraft, and
standard performance metrics and custom performance metrics,
wherein:
the standard performance metrics include data representative of global warming potential (GWP), contrail formation, NOx formation, and instantaneous CO2 emissions; and
the custom performance metrics include data representative of aircraft performance over time, late arrivals versus missed connections, and route timing.

23. An environmental impact measurement system for an aircraft, comprising:
a one-way data interface adapted to continuously receive and transmit aircraft data and flight plan data; and
a processing system in operable communication with the one-way data interface to receive the aircraft data and the flight management data transmitted therefrom, the processing system configured, upon receipt of the aircraft data and the flight plan data, to generate at least data representative of:
(i) real-time environmental impact of the aircraft, and
(ii) recommendations for improving the real-time environmental impact of the aircraft,
wherein the processing system is further configured:
to receive priority data representative of ranked priorities, the ranked priorities including cost, time, and environmental impact; and
in response to the priority data, to generate one or more advisories based on the ranked priorities.

24. An environmental impact measurement system for an aircraft, comprising:
- a one-way data interface adapted to continuously receive and transmit aircraft data and flight plan data;
- a processing system in operable communication with the one-way data interface to receive the aircraft data and the flight management data transmitted therefrom, the processing system configured, upon receipt of the aircraft data and the flight plan data, to generate at least data representative of:
  - (i) real-time environmental impact of the aircraft, and
  - (ii) recommendations for improving the real-time environmental impact of the aircraft; and
- a display device in operable communication with the processing system, the display device configured, in response to commands received from the processing system, to:
  - (i) display one or more images representative of the real-time environmental impact of the aircraft, and the recommendations for improving the real-time environmental impact of the aircraft, and
  - (ii) render a priority input user interface, the priority input user interface configured to allow a user to establish priorities for the recommendations and supply priority data representative thereof, the priority data representative of ranked priorities that include cost, time, and environmental impact.

25. An environmental impact measurement system for an aircraft, comprising:
- a one-way data interface adapted to continuously receive and transmit aircraft data and flight plan data; and
- a processing system in operable communication with the one-way data interface to receive the aircraft data and the flight management data transmitted therefrom, the processing system configured, upon receipt of the aircraft data and the flight plan data, to generate at least data representative of:
  - (i) real-time environmental impact of the aircraft, and
  - (ii) recommendations for improving the real-time environmental impact of the aircraft, wherein the data representative of recommendations for improving the real-time environmental impact of the aircraft comprise one or more of:
- flight route recommendations;
- aircraft altitude recommendations; and
- cruise number recommendations.

26. An environmental impact measurement system for an aircraft, comprising:
- a one-way data interface adapted to continuously receive and transmit aircraft data and flight plan data;
- a processing system in operable communication with the one-way data interface to receive the aircraft data and the flight management data transmitted therefrom, the processing system configured, upon receipt of the aircraft data and the flight plan data, to generate at least data representative of:
  - (i) real-time environmental impact of the aircraft, and
  - (ii) recommendations for improving the real-time environmental impact of the aircraft; and
- a data collection system in operable communication with the one-way data interface, the data collection system configured to:
  - receive at least a portion of the aircraft data,
  - determine, based at least in part on the aircraft data, carbon emission rate data, and
  - store the aircraft data and carbon emission rate data.

27. An environmental impact measurement system for an aircraft, comprising:
- a one-way data interface adapted to continuously receive and transmit aircraft data and flight plan data; and
- a data collection system in operable communication with the one-way data interface, the data collection system configured to:
  - receive at least a portion of the aircraft data,
  - determine, based at least in part on the aircraft data, carbon emission rate data, and
  - store the aircraft data and carbon emission rate data,
- wherein the data collection system comprises a tamper sensor configured to sense unauthorized access to the data collection system.

* * * * *